United States Patent [19]

Bligh et al.

[11] 3,759,446

[45] Sept. 18, 1973

[54] ROCKET MOTORS HAVING ANGULARLY MOVABLE EXHAUST NOZZLES

[75] Inventors: Jack Bligh, Aylesbury, Buckinghamshire; Kenneth Edward Silman, Wendover, Buckinghamshire, both of England

[73] Assignee: The Secretary of State for Defence in Her Britannic Majesty's Government of the United Kingdom of Great Britain and Northern Ireland, London, England

[22] Filed: Jan. 21, 1972

[21] Appl. No.: 219,772

[30] Foreign Application Priority Data
Jan. 21, 1971 Great Britain...................... 2,845/71

[52] U.S. Cl. ............................... 239/265.35, 60/232
[51] Int. Cl. ............................................. B64d 33/04
[58] Field of Search ................. 239/265.11, 265.19, 239/265.33, 265.35; 60/228, 232

[56] References Cited
UNITED STATES PATENTS

| | | |
|---|---|---|
| 3,048,977 | 8/1962 | Geary, Jr. ...................... 239/265.35 |
| 3,446,437 | 5/1969 | McCullough et al. .......... 239/265.35 |
| 3,090,198 | 5/1963 | Zeisloft .......................... 239/265.35 |
| 3,056,577 | 10/1962 | Kulisek ........................ 239/DIG. 19 |
| 3,208,215 | 9/1965 | Brown............................ 239/265.35 |
| 3,049,877 | 8/1962 | Sherman .................... 239/265.35 X |
| 3,401,887 | 9/1968 | Sheppard ....................... 239/265.35 |
| 3,451,625 | 6/1969 | Fruktaw.......................... 239/265.35 |
| 3,659,788 | 5/1972 | Oldfield et al. ............ 239/265.35 X |
| 3,270,505 | 9/1966 | Crabill et al. ................... 239/265.35 |

*Primary Examiner*—M. Henson Wood, Jr.
*Assistant Examiner*—Michael Mar
*Attorney*—Harry Saragovitz et al.

[57] ABSTRACT

An angularly movable exhaust nozzle for a rocket motor having two concentric pairs of spherical mating surfaces provided between a forward portion attached to the motor and the exhaust nozzle, the proximity of the surfaces being such that an annular labyrinth passage is provided between them. There may be sealing means in the passage remote from the inner surface of the nozzle or a shroud surrounding the nozzle and ducting rearward gases escaping from the passage.

The exhaust nozzle may be pivoted to the forward portion by means of a gimbal ring assembly.

8 Claims, 3 Drawing Figures

ROCKET MOTORS HAVING ANGULARLY MOVABLE EXHAUST NOZZLES

This invention relates to exhaust nozzle assemblies for rocket motors having angularly movable exhaust nozzles.

Rocket motors are provided with angularly movable exhaust nozzles whereby angular adjustment of the nozzle with respect to the motor changes the thrust vector of the exhaust gases leaving the nozzle and hence provides a means of changing the line of flight of the rocket motor.

Difficulties have been experienced with known rocket motors having angularly movable exhaust nozzles due to the problem of having to provide an efficient gas seal at the nozzle throat and also because it has been found that high torque loads are required to actuate the nozzle which leads to a weight and power penalty.

It is an object of the present invention to provide an improved exhaust nozzle assembly for a rocket motor having an angularly movable exhaust nozzle.

An exhaust nozzle assembly for a rocket motor according to the present invention has a forward portion for attachment to the motor and an exhaust nozzle providing a passage for exhaust gases from the motor, support means for supporting the exhaust nozzle on the forward portion for angular movement with respect to the motor, a first part spherical member on the nozzle for sliding engagement with a first corresponding complementary part spherical member on the forward portion, second members on the nozzle and the forward portion respectively which define a nozzle throat at their inner surface and have corresponding part spherical complementary surfaces for sliding engagement with each other, there being defined between the complementary first members, between the first members and the second members, and, between the second members an annular labyrinth passage.

In one embodiment annular sealing means are provided in the labyrinth passage between said first members and remote from the inner surface of the nozzle throat.

In a further embodiment a flexible gas tight annular gaiter bridges the labyrinth passage between the first members on the one hand and the second members on the other hand.

Universal angular movement of the exhaust nozzle about mutually normal axes which are normal to the fore and aft axis of the motor may be provided by a gimbal ring support arrangement in which a gimbal ring is supported for angular movement about one say pitch axis on trunnions pivotally supported on the motor and which ring in turn supports the nozzle for angular movement on trunnions about a second, yaw axis normal to the pitch axis.

Three embodiments of the invention are illustrated by way of example in the accompanying diagrammatic drawings of which:

Figure 1:
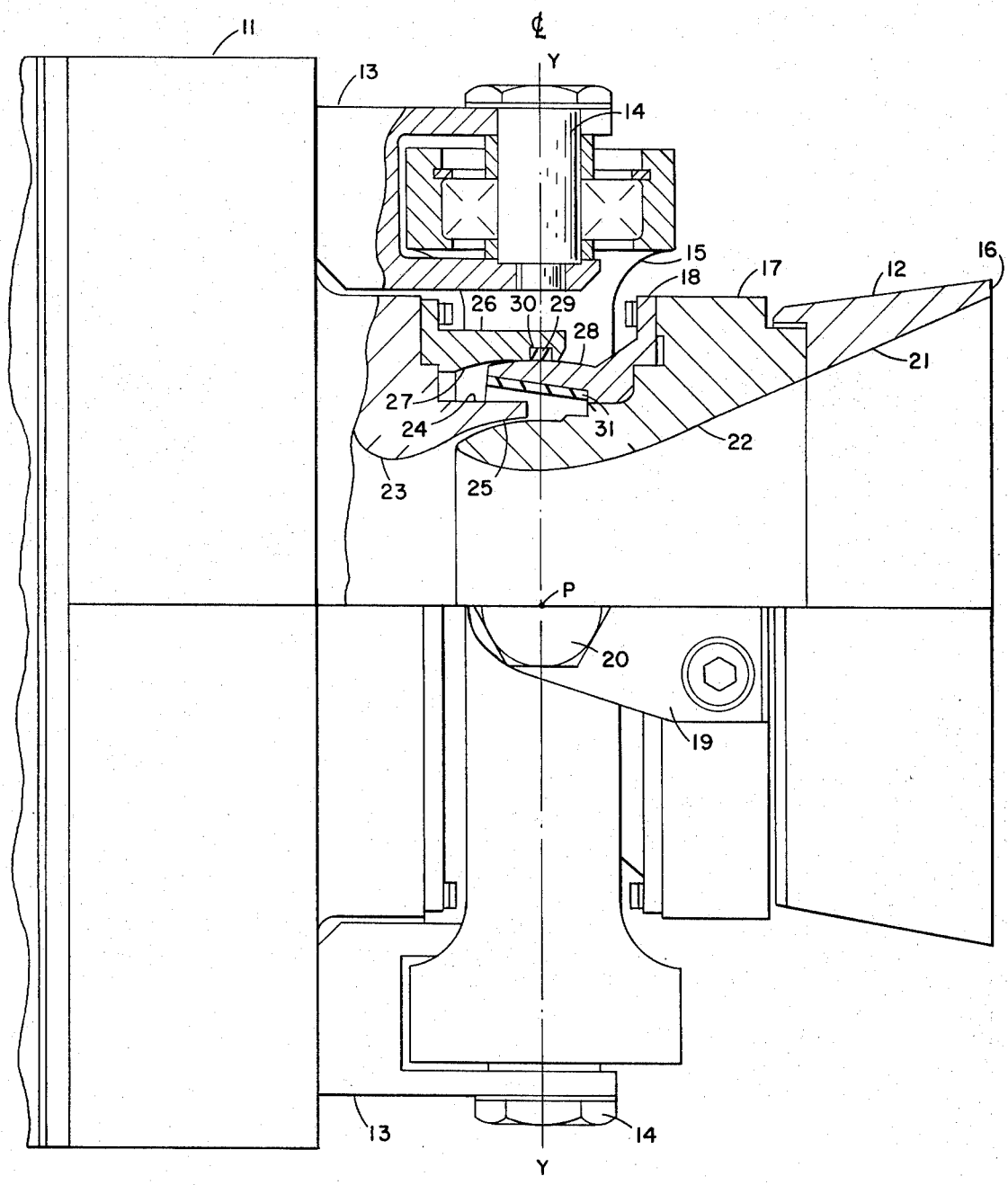
FIG. 1 is a half sectional side elevation of a first embodiment.

Referring first to FIG. 1 the rear end region of a rocket motor is shown at 11 and an exhaust nozzle at 12. Two support arms 13 extend from the end region 11 and carry trunnions 14 which support a gimbal ring 15 for angular motion about a yaw axis Y—Y which is normal to the fore and aft axis of the rocket motor. The nozzle 12 comprises a rear part 16 a throat part 17 and a male seal housing 18. Two support arms, one of which is shown at 19 extend forwardly from the throat part 17 and are supported by trunnions, one of which is shown at 20, on the gimbal ring 15 for angular movement about a pitch axis P which is normal to the yaw axis Y-Y.

A venturi throat is defined by the inner surfaces 21, 22 of the rear part 16 and throat 17, and, the inner surface 23 of the rear region 11 of the rocket motor. A part spherical concave surface 24 to the rear of the surface 23 complements a corresponding part spherical convex surface 25. An annular female seal housing 26 is secured to the end region 11 and has a part spherical concave surface 27 which complements a corresponding part spherical convex surface 28 on the male seal housing 18.

A polytetrafluoroethylene lip seal 29 is housed in a channel 30 in in the housing 26 and sealed against the surface 28.

A layer of insulating material 31 is secured to the housing 18.

An annular labyrinth type channel is thus formed between the surfaces 24, 25 and the items 17, 11, 26, 31 and 18 extending as far as the lip seal 29.

Power actuators (not shown) are provided for moving the nozzle angularly on the gimbal support with respect to the rocket motor.

In practice it is found that because of the gimbal suport the actuator forces required are low.

Also, the close fit between the surfaces 24, 25 and 27, 28 and the extended nature of the labyrinth channel prevents or delays erosion and leakage past the lip seal 29.

Figure 2:
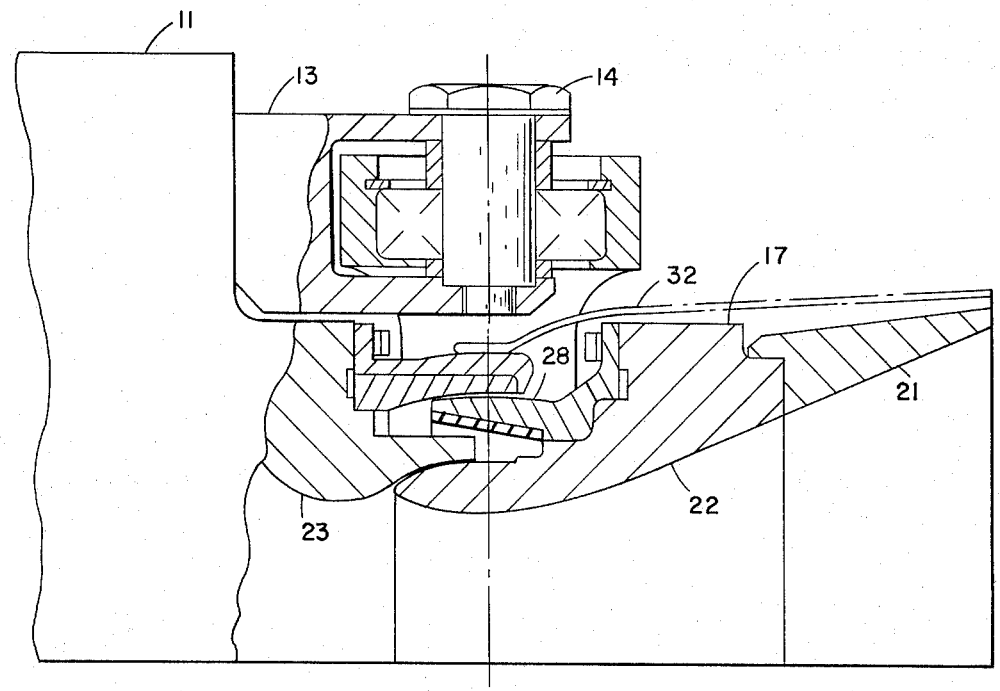
FIGS. 2 and 3 are sectional half view side elevations of a second and third embodiment, respectively.

The embodiment shown at FIG. 2 is basically similar to that of FIG. 1 except that the lip seal 29 is not used and a shroud 32 is provided to duct any leaking gases to the rear.

Figure 3:
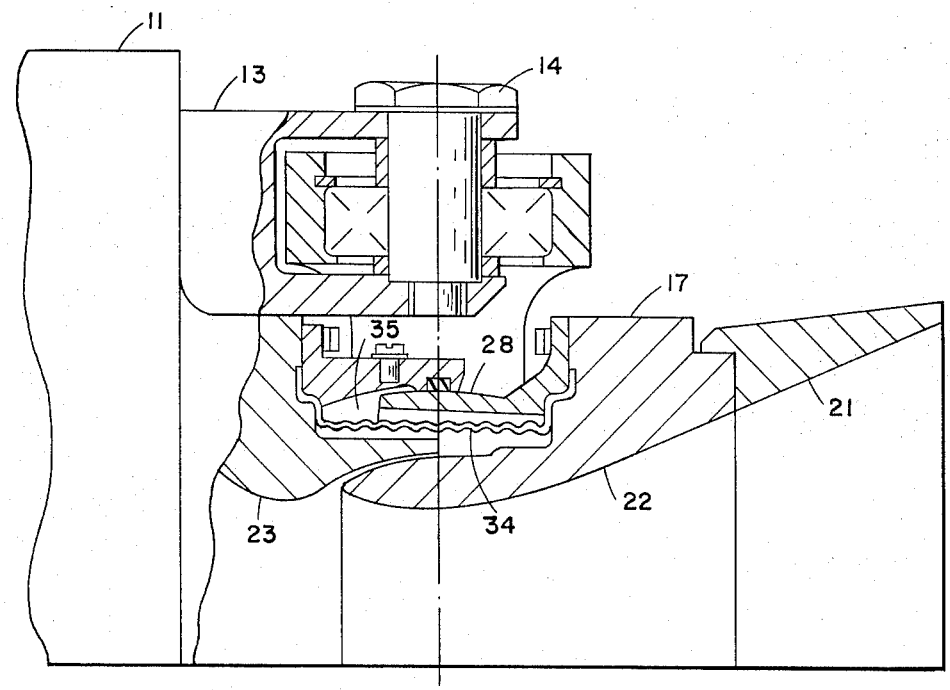

The embodiment of FIG. 3 is also basically similar to that of FIG. 1 except that an annular flexible gaiter 34 of Hypalon (Registered Trade Mark) or butyl rubber bridges the annular channel and the space 35 formed between it and the lip seal is filled with a silicone oil or similar type of fluid which comprises both a heat sink for cooling and also acts as a lubricant.

As shown the concave surfaces 24, 27 are on the forward portion and the convex surfaces are on the angularly movable nozzle but it will be apparent that the surfaces could be reversed.

In the embodiments shown the nozzle has two degrees of freedom which are provided by the gimbal support. However, in some cases a single degree of freedom will suffice. Thus, in the case of a motor having four exhaust nozzles, one opposed pair of nozzles may be supported to have a single degree of freedom about the same say pitch axis whilst the other opposed pair are supported to have a single degree of freedom about the same say yaw axis normal to said pitch axis. With this arrangement differential adjustment of the pairs will provide the necessary thrust vector control.

The embodiments of the invention in which an exclusive property or privilege is claimed are defined as follows:

1. An exhaust nozzle assembly for a rocket motor, having a forward portion for attachement to the motor, an exhaust nozzle providing a passage for exhaust gases from the motor, support means for supporting the exhaust nozzle on the forward portion for angular movement with respect to the motor, a first part spherical member on the nozzle for sliding engagement with a first corresponding complementary part spherical member on the forward portion, second members on the nozzle and the forward portion respectively which define a nozzle throat at their inner surface and have corresponding part spherical complementary surfaces for sliding engagement with each other, there being defined between the complementary first members, between the first members and the second members, and, between the second members, an annular labyrinth passage, and having a shroud surrounding the exhaust nozzle, for directing rearward gases leaking from the laybyrinth passage.

2. An exhaust nozzle as claimed in claim 1 and having annular sealing means located in the labyrinth passage between said first members and remote from the inner surface of the nozzle throat.

3. An exhaust nozzle as claimed in claim 1 and having a flexible gas tight annular gaiter bridging the labyrinth passage between the first members and the second members.

4. An exhaust nozzle as claimed in claim 2 and having a flexible gas tight annular gaiter bridging the labyrinth passage between the first members and the second members, and wherein the space between the gaiter and the annular sealing means is filled with a liquid.

5. An exhaust nozzle as claimed in claim 4 and wherein the liquid is a silicone oil.

6. An exhaust nozzle as claimed in claim 1 wherein part of the labyrinth passage is lined with an insulating material.

7. An exhaust nozzle as claimed in claim 2, and wherein the sealing means are made of polytetraflurorethylene.

8. An exhaust nozzle as claimed in claim 1 and having a gimbal ring, a first trunnion on said ring for pivotal mounting on the motor, and a second trunnion on said ring and supporting said nozzle.

* * * * *